United States Patent
Hwang

(10) Patent No.: US 7,145,974 B2
(45) Date of Patent: Dec. 5, 2006

(54) APPARATUS AND METHOD FOR TRANSMITTING DATA BETWEEN TRANSMISSION SYSTEMS USING DISSIMILAR PHASE CLOCKS

(75) Inventor: In-Jae Hwang, Choongcheongbuk-Do (KR)

(73) Assignee: LG Electronics Inc., Seoul (KR)

( * ) Notice: Subject to any disclaimer, the term of this patent is extended or adjusted under 35 U.S.C. 154(b) by 811 days.

(21) Appl. No.: 10/301,630

(22) Filed: Nov. 22, 2002

(65) Prior Publication Data
US 2003/0118140 A1 Jun. 26, 2003

(30) Foreign Application Priority Data
Dec. 24, 2001 (KR) ............................... 2001-83919

(51) Int. Cl.
*H04L 7/00* (2006.01)
*H04L 25/00* (2006.01)
*H04L 25/40* (2006.01)

(52) U.S. Cl. ........................ 375/372; 375/371
(58) Field of Classification Search ................ 375/372, 375/371, 365; 711/149; 710/57
See application file for complete search history.

(56) References Cited

U.S. PATENT DOCUMENTS

| 4,434,498 | A | * | 2/1984 | Mathieu | 375/365 |
| 5,119,406 | A | * | 6/1992 | Kramer | 375/372 |
| 5,956,748 | A | * | 9/1999 | New | 711/149 |
| 6,064,706 | A | * | 5/2000 | Driskill et al. | 375/372 |
| 6,594,329 | B1 | * | 7/2003 | Susnow | 375/372 |

* cited by examiner

*Primary Examiner*—Phuong Phu
(74) *Attorney, Agent, or Firm*—Fleshner & Kim LLP.

(57) ABSTRACT

An apparatus and a method for transmitting data between transmission systems using clock sources having dissimilar phases is disclosed. After monitoring a state of a transmission system of the other party, when the transmission system of the other party is in a normal state, a write address is generated according to a first system clock, and generation of a read address is enabled after a prescribed time interval has elapsed from the generation time of the write address. By generating the write address and a read address with a certain time interval, it is possible to prevent a write address and a read address from being generated at the same time, and accordingly address collision and data loss caused by address collision can be prevented.

31 Claims, 4 Drawing Sheets

APPARATUS AND METHOD FOR TRANSMITTING DATA BETWEEN TRANSMISSION SYSTEMS USING DISSIMILAR PHASE CLOCKS

BACKGROUND OF THE INVENTION

1. Field of the Invention

The present invention relates to a high speed transmission system, such as a wideband digital cross-connect system (WDCS) and a broadband digital cross-connect system (BDCS), etc., and in particular to an apparatus and a method for transmitting data between transmission systems that each uses a clock source having a phase different from the other.

2. Background of the Related Art

A digital cross-connect system (DCS) is a high speed transmission system. The DCS receives a digital signal level N (DS-N) as an asynchronous signal and a synchronous transport module level N (STM-N) as a synchronous signal, and performs functions such as circuit distribution, branch, performance monitoring, test connection and network management.

The DCS includes a wideband digital cross-connect system (WDCS) and a broadband digital cross-connect system (BDCS).

The WDCS performs a cross-connect function of DS1, DS1E, DS3 and STM-N signals, and performs circuit distribution by wavelengths in a TU3/TU12 hierarchy. The BDCS performs a cross-connect function of DS3 and STM-N signals, and cross-connects a signal inputted from an AU3/AU4 hierarchy with a channel by using non-blocking digital switching according to an electronic control without performing a digital/analog conversion. Simultaneously the BDCS performs functions of a PCM terminal apparatus, a multiplexer, and an optical transmission apparatus and receives a broadband service circuit used for a broadband intergrated services digital network (B-ISDN).

The WDCS and the BDCS each uses a system clock having a phase different from the other. Although each transmission system uses a system clock different from the other, data transmission is required between the transmission systems.

Accordingly, a dual port RAM (DPRAM) is largely used to process data between transmission systems using dissimilar system clocks. Generally, the DPRAM includes an input port and an output port and can input/output data through the input/output ports.

FIG. 1 is a block diagram illustrating a construction of a related art data transmission apparatus between transmission systems using dissimilar phase clocks.

As depicted in FIG. 1, the related art data transmission apparatus between the transmission systems using the dissimilar clocks includes a receiving unit 10 for processing reception data according to a first system clock (SysClk_A) based on a clock source of a first system and a write address generating unit 20 for generating a write address according to the first system clock. The apparatus further includes a read address generating unit 30 for generating a read address according to a second system clock (SysClk_B) based on a clock source of a second system and a transmitting unit 50 for processing transmission data according to the second system clock. Finally, a DPRAM 40 is provided for processing data between the receiving unit 10 and the transmitting unit 50 according to the write address and the read address.

An operation of the related art data transmission apparatus between the transmission systems using the dissimilar clocks as depicted in FIG. 1 is next described. In this example, data is transmitted from the first system to the second system will be described.

When data is transmitted from the first system to the receiving unit 10 of the second system, the write address generating unit 20 outputs a write address (W_ADD), a write clock (WCLK), and a write enable signal (WREN) to the DPRAM 40 according to the first system clock (SysClk_A).

The receiving unit 10, which is operated according to the first system clock, stores the received data in a memory through the input port of the DPRAM 40 according to the write address (W_ADD).

In the meantime, the read address generating unit 30 outputs a read address (R_ADD), a read clock (RCLK), and a read enable signal (RDEN) to the DPRAM 40 according to the second system clock (SysClk_B).

The transmitting unit 50, which is operated according to the second system clock (SysClk_B), fetches data from the read address through the output port of the DPRAM 40 and transmits it to the second system.

Data transmission from the second system to the first system is performed by the same method as that for transmitting data from the first system to the second system. Accordingly, an explanation related to that process will be omitted.

By using the DPRAM 40 to perform both input and output functions, the related art apparatus for transmitting data between the transmission systems using the dissimilar phase clocks can transmit/receive data between the first system operating according to the first system clock and the second system operating according to the second system clock.

However, the related data transmission apparatus between the transmission systems using the dissimilar phase clocks has various problems. For example, because a write address and a read address applied to the DPRAM may be simultaneously generated at a certain time "t", the two addresses collide with each other. In that case, due to the collision of the write address and the read address, data write and output functions may not be performed normally, and data transmission capacity may be lowered.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

It is another object of the present invention to provide an apparatus and a method for transmitting data between transmission systems using dissimilar phase clocks that can accurately and credibly performing data transmission between the transmission systems.

It is another object of the present invention to provide an apparatus and a method for transmitting data between transmission systems using dissimilar phase clocks capable of performing stabilized matching between the two systems. It is another object of the present invention to provide an apparatus and a method for transmitting data between transmission systems using dissimilar phase clocks that can prevent a collision of a write address and a read address whe4n using a DPRAM.

In order to achieve at least the above-mentioned objects in whole or in part, there is provided an apparatus for transmitting data between transmission systems using dissimilar phase clocks includes a DPRAM for processing transmission/reception data between a first system and a second system; a data recording unit for recording reception data in the DPRAM according to a first system clock and controlling a fetch time of the recorded data; and a data fetching unit for fetching the data from the DPRAM according to the second system clock by the control of the data recording unit.

Additionally, in order to achieve at least the above objects, in whole or in parts, there is provided an apparatus for transmitting data between transmission systems using dissimilar phase clocks, including a receiving unit for operating a first system clock and processing data received from the first system; a write address generating unit for generating a write address according to the first system clock and controlling generation of a read address; a read address generating unit operated by the control of the write address generating unit and generating a read address according to a second system clock; a transmitting unit for processing data to be transmitted to the second system according to the second system clock; and a DPRAM for processing data between the receiving unit and the transmitting unit according to the write address and the read address.

Additionally, in order to achieve at least the above objects, in whole or in parts, there is provided a method for transmitting data between transmission systems using dissimilar phase clocks, including monitoring a state of a transmission system of the other party; generating a write address according to a first system clock when the transmission system of the other party is in a normal state; recording data by gaining access to a DPRAM according to the write address; generating a read address according to a second system clock when a prescribed time interval elapsed from the generation time of the write address; and fetching data from the DPRAM according to the read address.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In the following description of a data transmission between transmission systems using system clocks having different phases according to the preferred embodiment, data transmission from a first system to a second system will be described. An explanation about data transmission from the second system to the first system will be abridged since it is substantially similar.

Figure 1:
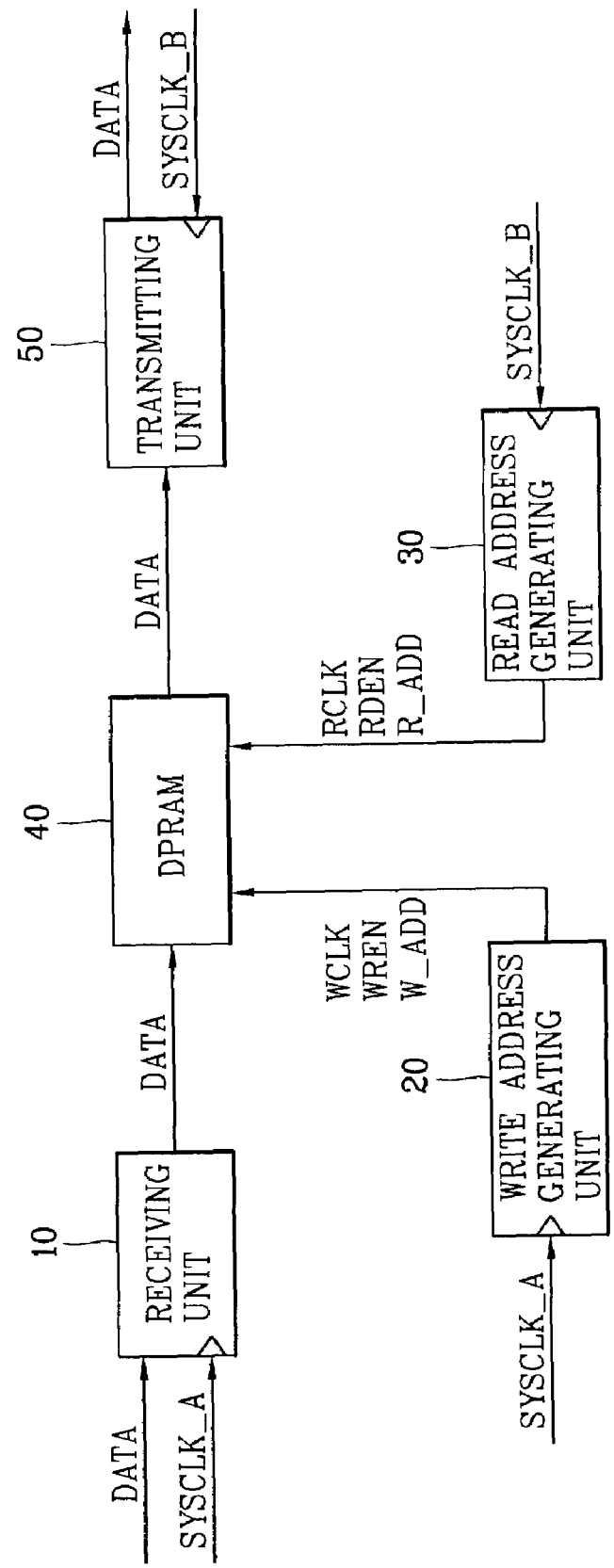
FIG. 1 is a block diagram illustrating a construction of a related art apparatus for transmitting data between transmission systems having dissimilar phase clocks.
Figure 2:
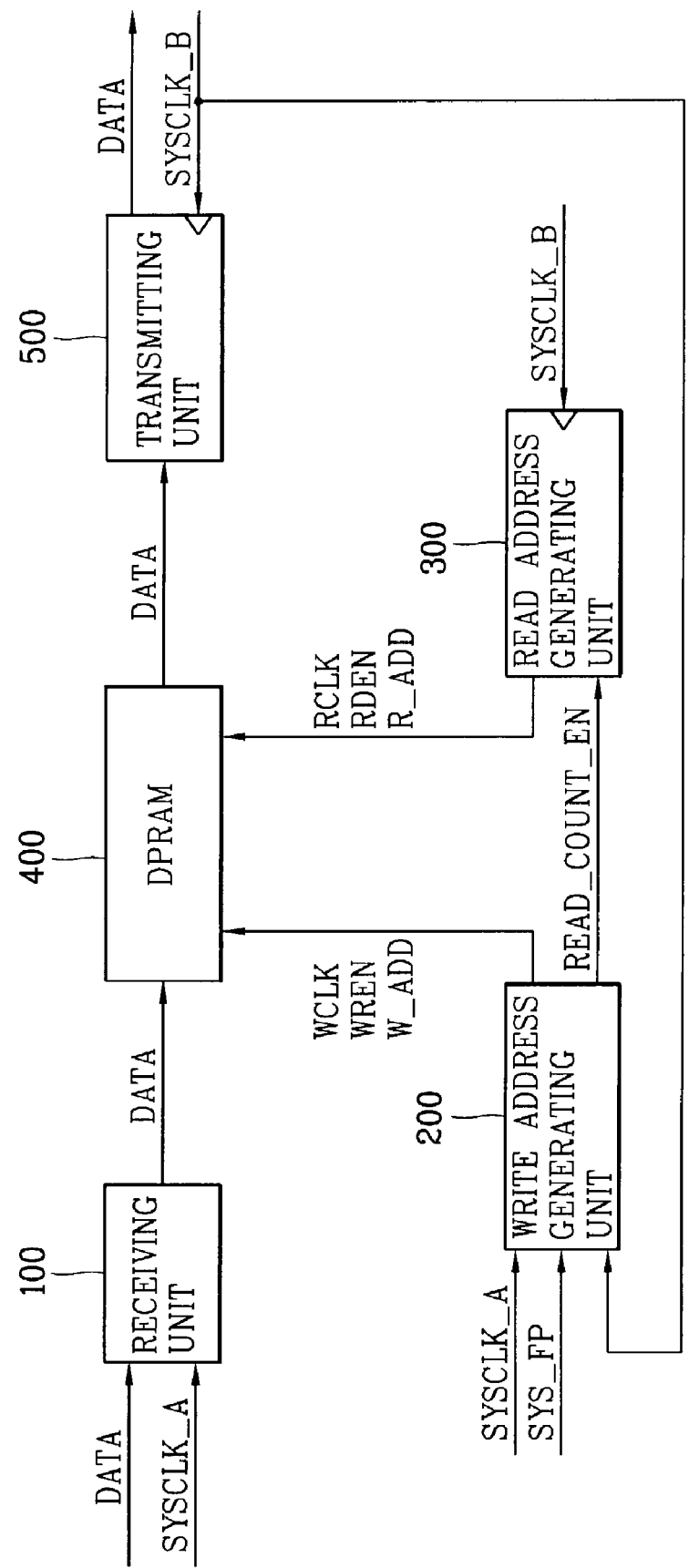
FIG. 2 is a block diagram illustrating a construction of an apparatus for transmitting data between transmission systems using dissimilar phase clocks in accordance with a preferred embodiment of the present invention.

FIG. 2 is a block diagram illustrating a construction of an apparatus for transmitting data between transmission systems using dissimilar phase clocks in accordance with a preferred embodiment of the present invention.

As depicted in FIG. 2, the preferred embodiment of the data transmission apparatus includes a DPRAM 400 for processing data transmitted/received between a first and a second systems, a data recording unit for recording received data in the DPRAM according to a first system clock and controlling a fetch time of the recorded data, and a data fetch unit for fetching the data from the DPRAM according to a second system clock.

In more detail, the apparatus for transmitting data between transmission systems using dissimilar phase clocks preferably includes a receiving unit 100 for processing data received from the first system according to the first system clock (SysClk_A) based on a clock source of the first system. It further preferably includes a write address generating unit 200 for generating a write address according to the first system clock (SysClk_A) and controlling the generation of a read address. Next, a read address generating unit 300 is preferably provided and operated according to the control of the write address generating unit 200 to generate a read address according to a second system clock (SysClk_B) based on a clock source of the second system. The transmission apparatus further includes a transmitting unit 500 for processing data to be transmitted to the second system according to the second system clock (SysClk_B) and the DPRAM 400 for processing data between the receiving unit 100 and the transmitting unit 500 according to the write address and the read address.

Figure 3:
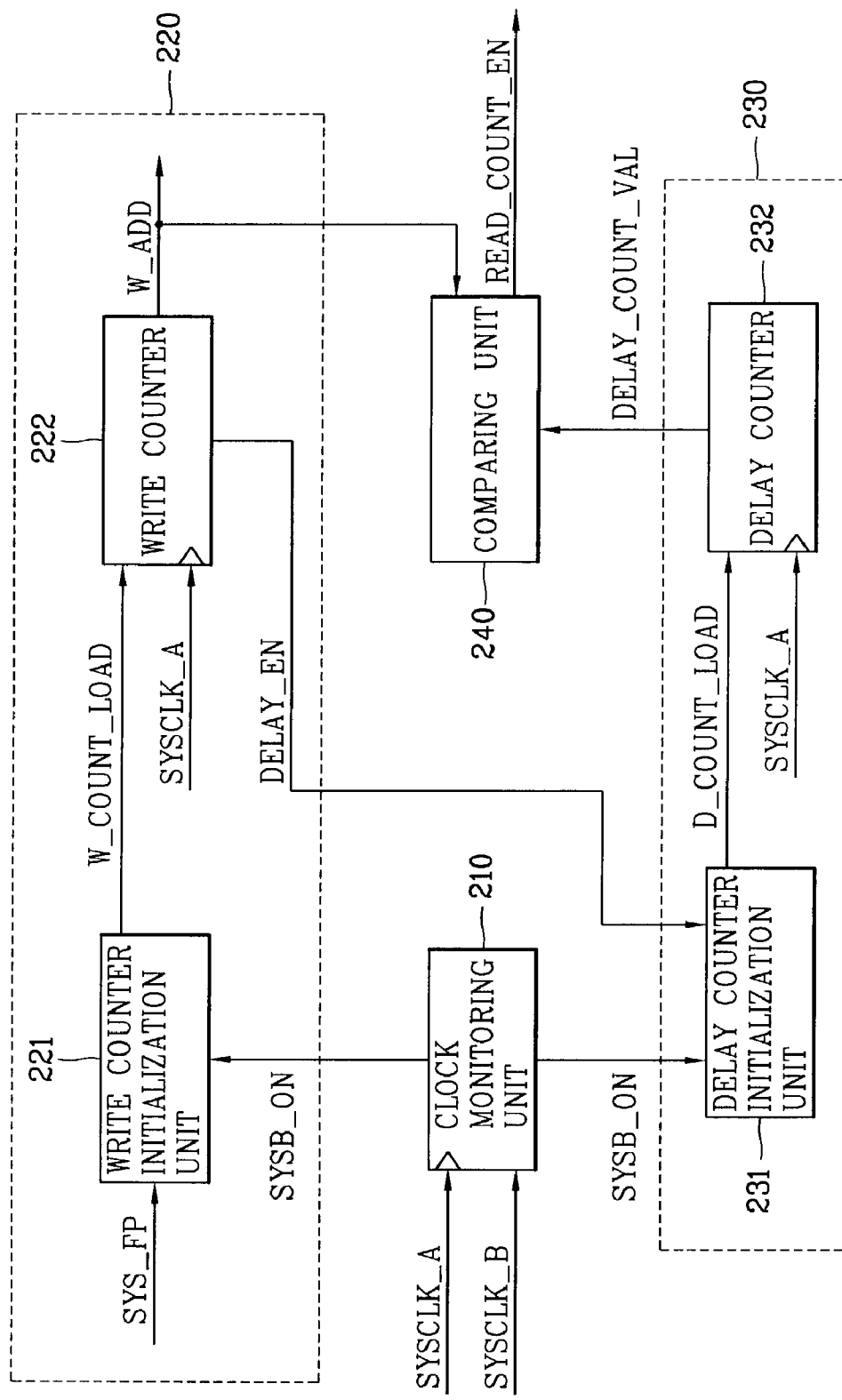
FIG. 3 illustrates a construction of a write address generating unit of the apparatus of FIG. 2.

FIG. 3 illustrates additional detail of the write address generating unit 200. As depicted in FIG. 3, the write address generating unit 200 includes a clock monitoring unit 210 for monitoring a state of the second system, a write address outputting unit 220 for outputting a write address according to the first system clock using the output of the clock monitoring unit 210, and a delay counting value outputting unit 230 for outputting a delay counting value according to the first system clock using the output of the clock monitoring unit 210 and a delay enable signal outputted from the write address outputting unit 220. Additionally, a comparing unit 240 is provided for controlling generation of a read address by comparing the write address with the delay counting value.

The clock monitoring unit 210 preferably receives the first and second system clocks and monitors whether or not the second system is equipped. The monitoring is performed by dividing the second system clock by using the first system clock and sensing a change of the divided second system clock. If the second system is equipped and is in a normal state, the clock monitoring unit 210 outputs a state normal signal of the other party (SysB_ON).

The write address outputting unit 220 preferably includes a write counter initialization unit 221 and a write counter 222. The write counter initialization unit 221 initializes the write counter 222 when it receives the state normal signal of the other party (SysB-ON) from the clock monitoring unit 210 and a frame pulse signal (Sys_FP). The write counter 222 outputs a write address according to the first system clock according to the control of the write counter initialization unit 221. The write counter 222 further generates a delay enable signal (DELAY_EN). The control of the write counter initialization unit 221 is provided by a W-COUNT-LOAD signal to the write counter 222.

The frame pulse signal (Sys_FP) is for informing a frame state of data transmitted from the first system, and it divides the data by frames.

The delay counting value outputting unit 230 preferably includes a delay counter initialization unit 231 and a delay counter 232. The delay counter initialization unit initializes the delay counter 232 when the state normal signal of the other party is outputted from the clock monitoring unit 210 and the delay enable signal is outputted from the write counter 222. The delay counter 232 receives the control signal (D-COUNT-LOAD) of the delay counter initialization unit 231 and the first system clock, and outputs a delay counting value in accordance with the control of the delay counter initialization unit 231.

An operation of the apparatus for transmitting data between the transmission systems using the dissimilar clocks according to the preferred embodiment will next be described in more detail.

When data is transmitted from the first system to the second system, the receiving unit 100 clocks the data transmitted from the first system according to the first system clock (SysClk_A) and records the data in a memory region of the DPRAM 400 corresponded to a write address (W_ADD) outputted from the write address generating unit 200.

In order to maintain a prescribed time interval between a write address generation time and a read address generation time, to prevent a write address and a read address from being generated at the same time, the write address generating unit 200 controls the generation of a read address until a prescribed period of time has elapsed from the generation of a write address.

The read address generating unit 300 then generates a read address according to the control of the write address generating unit 200, and the transmitting unit 500 gains access to the memory region of the read address, retrieves the data, and transmits it to the second system.

Accordingly, because the write address and the read address are generated with the prescribed time interval from each other, it is possible to prevent the receiving unit 100 and the transmitting unit 500 from simultaneously gaining access to the same region of the DPRAM 400.

Figure 4:
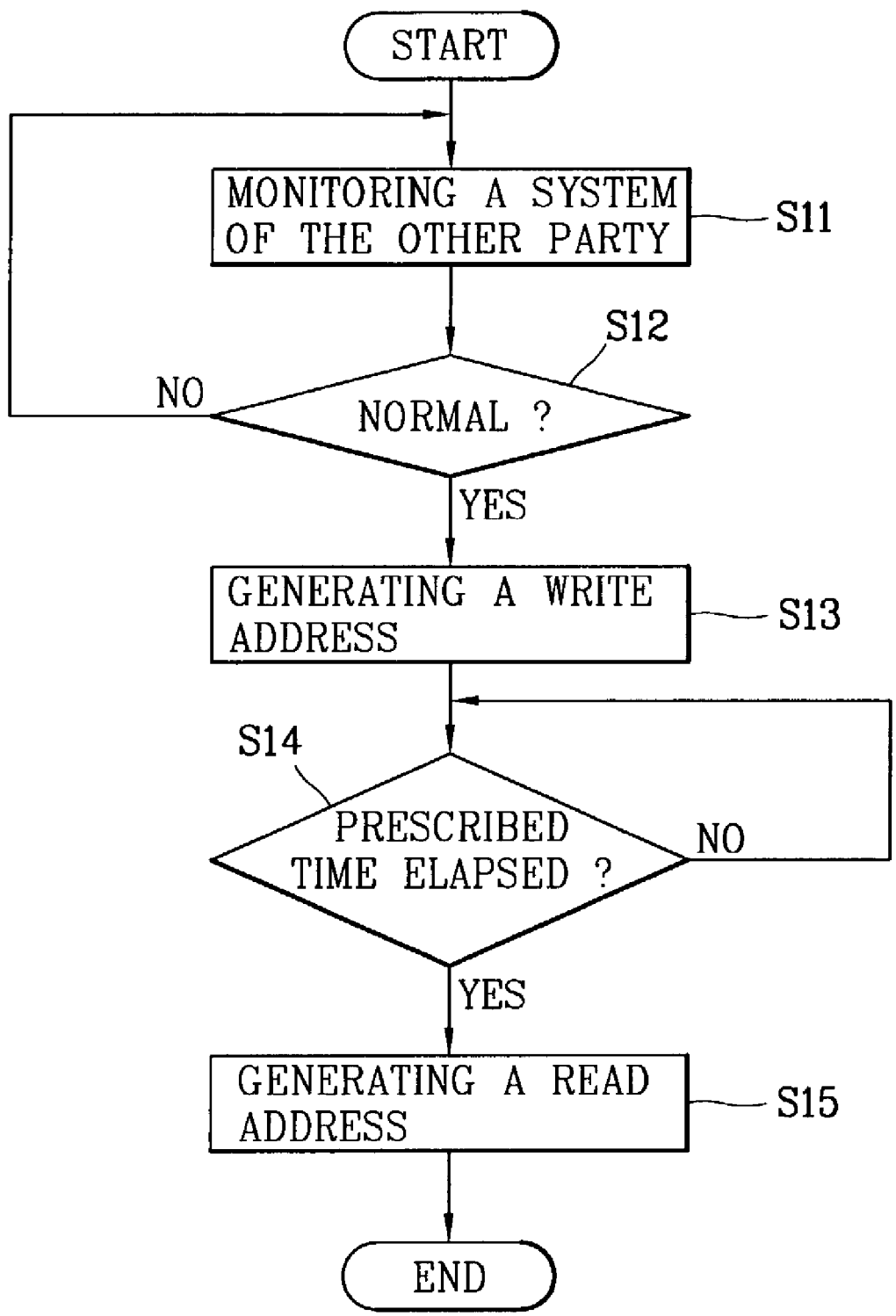
FIG. 4 is a flow chart illustrating a method for transmitting data between transmission systems having dissimilar phase clocks in accordance with the preferred embodiment of the present invention.

FIG. 4 is a flow chart illustrating a method for transmitting data between transmission systems using dissimilar phase clocks in accordance with the preferred embodiment of the present invention.

Referring to FIG. 4, The clock monitoring unit 210 of the write address generating unit 200 first divides the second system clock (SysClk_B) using the first system clock (SysClk_A) and monitors a state of the second system by sensing a change of the divided second system clock, as shown at step S11.

When the second system is equipped and is in a normal state, the clock monitoring unit 210 outputs the state normal signal of the other party (SysB-ON) as an enable state, as shown at step S12. Otherwise, monitoring is continued.

Next, a write address is generated, as shown in step S13. Thus, in data transmission from the first system to the receiving unit 100, the write counter initialization unit 221 of the write address generating unit 200 outputs a write counting load signal (w count_load) when the state normal signal of the other party (SysB-ON) is enabled by the the clock monitoring unit 210 and a frame pulse signal (Sys_FP) is input to the write counter initialization unit 221.

The write counter 222 receiving the write counting load signal accordingly generates a write address (w_ADD) according to the first system clock and applies it to the DPRAM 400. For example, when the write counter 222 is a 3bit write counter, it repeatedly generates a write address "000"~"111".

When the state normal signal of the other party (SysB-ON) is outputted from the clock monitoring unit 210 and a delay enable signal (delay_en) is outputted from the write counter 222, the delay counter initialization unit 231 outputs a delay counting load signal (d_count_load). The delay enable signal can be set as a specific value, for example "000," of the write address generated in the write counter 222.

When the delay counting load signal is inputted, the delay counter 232 outputs a delay counting value (delay_count_val) by clocking the delay counting load signal (d count_load) according to the first system clock.

Next, it is determined whether a prescribed period of time has elapsed, as shown in step S14. Thus, the comparing unit 240 compares the write address ($w_{13}$ ADD) outputted from the write counter 222 with the delay counting value (delay$_{13}$ count$_{13}$ val) outputted from the delay counter 232. For example, when there is a difference of 3 between the write address and the delay counting value, the comparing unit 240 outputs a read counting enable signal (read-count-en) to the read address generating unit 300.

The read address generating unit 300 receiving the read counting enable signal operates a read counter (not shown in FIG. 2) according to the second system clock (SysClk_B), and generates a read address. The generated read address is then applied to the DPRAM 400.

As described above, in order to generate a write address and a read address with the prescribed time interval, the comparing unit 240 of the write address generating unit 200 controls the generation time of the read address.

Accordingly, the receiving unit 100 gains access to the DPRAM 400 according to the write address and the transmitting unit 500 gains access to the DPRAM 400 according to the read address. It is therefore possible to prevent the receiving and transmitting units 100, 500 from gaining access to the same address at the same point in time.

As described above, in the apparatus and the method for transmitting data between the transmitting systems using dissimilar phase clocks in accordance with the present invention has many advantages. For example, by maintaining the prescribed time interval between a write address generation time and a read address generation time, it is possible to prevent a write address and a read address from colliding with each other. Accordingly, data loss can be prevented.

In addition, by accurately transmitting data between transmission systems using dissimilar phases without data loss, a reliability of system matching can be improved.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An apparatus for transmitting data between transmission systems, comprising:
    a DPRAM configured to process transmission and reception data between a first system and a second system;
    a data recording unit configured to generate a write address for recording data received from the first system in the DPRAM according to a first system clocks;
    a clock monitoring unit configured to compare the first system clock and a second system clock different from the first system clock;
    a delay unit configured to generate a delay value based on the clock comparison;
    a comparing unit configured to compare the delay value and the write address to determined whether a prescribed period of time has elapsed, and to generate a read control signal to control a retrieval time of the recorded data when the prescribed period of time has elapsed; and
    a data retrieving unit configured to retrieve the recorded data from the DPRAM according to the second system clock and the read control signal.

2. The apparatus of claim 1, wherein the data recording unit comprises:
    a receiving unit operated according to the first system clock and configured to process data received from the first system; and
    a write address generating unit configured to generate the write address according to the first system clock and control a read address generation of the data retrieving unit, the write address generating unit including the clock monitoring unit, delay unit, and comparing unit.

3. The apparatus of claim 1, wherein the clock monitoring unit monitors a state of the second system based on comparison of the first and second system clocks, and the delay unit generates the delay value based on the monitored state of the second system.

4. The apparatus of claim 3, wherein the data recording unit includes:
    a write counter initialization unit configured to initialize a write counter when a frame pulse signal for dividing the data by frames and a state normal signal is received from the clock monitoring unit; and
    a write counter coupled to receive the first system clock and a control signal from the write counter initialization unit and output the write address according to the first system clock and the control signal from the write counter initialization unit.

5. The apparatus of claim 4, wherein the delay unit further comprises:
    a delay counter initialization unit coupled to receive the delay enable signal and the state normal signal and to generate an initialization signal; and
    a delay counter coupled to receive the first system clock and the initialization signal and to generate a counting value corresponding to the delay value according to the first system clock by the control of the delay counter initialization unit.

6. The apparatus of claim 1, wherein the data retrieving unit comprises:
    a read address generating unit coupled to receive the read control signal and the second system clock and generate a read address according to the second system clock; and
    a transmitting unit configured to retrieve data from the read address of the DPRAM and transmit the data to the second system according to the second system clock.

7. An apparatus for transmitting data between transmission systems using dissimilar clocks, comprising:
    a receiving unit to process data received from a first system according to a first system clock;
    a write address generating unit to generate a write address according to the first system clock and control a generation of a read address;
    a read address generating unit coupled to receive a control signal from the write address generating unit and to generate a read address according to the control signal and a second system clock, the control signal generated based on a comparison of the write address and a delay value, the delay value ensuring that the read address is generated a prescribed period of time after the write address and being based on a comparison of the first and second system clocks, wherein the first and second system clocks are different; and
    a transmitting unit to process data to be transmitted to a second system according to the second system clock; and
    a DPRAM to process data between the receiving unit and the transmitting unit according to the write address and the read address.

8. The apparatus of claim 7, wherein the write address generating unit receives the second system clock.

9. The apparatus of claim 7, wherein the write address generating unit comprises:
    a clock monitoring unit to monitor a state of the second system;
    a write address outputting unit to output a write address according to the first system clock and the output of the clock monitoring unit and to output a delay enable signal;
    a delay counting value outputting unit to output a delay counting value corresponding to the delay value according to the first system clock and the output of the clock monitoring unit and the delay enable signal; and
    a comparing unit to control the generation of the read address by comparing the write address with the delay counting value.

10. The apparatus of claim 9, wherein the clock monitoring unit divides the second system clock using the first system clock and monitors whether or not the second system is equipped and is in a normal state, and when it is determined that the second system is equipped and is in the normal state, the clock monitoring unit outputs a state normal signal as an enable state.

11. The apparatus of claim 9, wherein the write address outputting unit comprises:
    a write counter initialization unit to initialize a write counter when the write counter initialization unit receives the frame pulse signal and an enable state output from the clock monitoring unit; and
    a write counter to output a write address according to the first system clock and a control of the write counter initialization unit, and to output a certain value of the write address as a delay enable signal.

12. The apparatus of claim 9, wherein the delay counting value outputting unit comprises:
    a delay counter initialization unit to initialize a delay counter when it receives an enable state output from the clock monitoring unit and the delay enable signal is outputted from the write address outputting unit; and
    a delay counter for outputting a delay counting value according to the first system clock and the control of the delay counter initialization unit.

13. The apparatus of claim 7, wherein the write address generating unit comprises:
  a clock monitoring unit to monitor a state of the second system;
  a write counter initialization unit to initialize a write counter when the write counter initialization unit receives a frame pulse signal and a state normal signal of the second system is outputted form the clock monitoring unit;
  a write counter to output a write address according to a first system clock and the control of the write counter initialization unit, and to output a certain value of the write address as a delay enable signal;
  a delay counter initialization unit to initialize a delay counter when it receives the state normal signal of the second system and the delay enable signal;
  a delay counter to output a delay counting value corresponding to the delay value according to the first system clock and the control of the delay counter initialization unit; and
  a comparing unit to compare the write address with the delay counting value and to control a generation of a read address.

14. A method for transmitting data between first and second transmission systems comprising:
  monitoring a state of a second transmission system by a first transmission system;
  generating a write address according to a first system clock when the second transmission system is in a normal state;
  recording data by gaining access to a DPRAM according to the write address;
  generating a read address according to a second system clock and a control signal, the control signal generated based on a comparison of the write address and a delay value, the delay value ensuring that the read address is generated a prescribed period of time after the write address and being based on the monitored state of the second transmission system, and wherein the first and second system clocks are different; and
  retrieving the data from the DPRAM according to the read address.

15. The method of claim 14, wherein the first system clock is provided by the first system and the second system clock is provided by the second system, wherein the first and second clocks respectively have a phase that is different from each other.

16. The method of claim 14, wherein a clock source of the first system shows it is based on the first transmission system, and a clock source of the second system shows it is based on the second transmission system when data is transmitted from the first transmission system to the second transmission system.

17. The method of claim 14, wherein the clock source of the first system shows it is based on the second transmission system, and a clock source of the second system shows it is based on the first transmission system when data is transmitted from the second transmission system to the first transmission system.

18. A method of transmitting data between transmission systems using dissimilar clocks, comprising:
  monitoring a state of a first transmission system by a second transmission system;
  generating a write address when the first transmission system is determined to be in a normal state; and
  generating a read address when a prescribed period of time elapses after the generation of the write address, wherein generation of the read address is controlled by a system clock of the first transmission system and a control signal, the control signal generated based on a comparison of the write address and a delay value corresponding to said prescribed period of time.

19. The method of claim 18, wherein the read address is not generated until the prescribed period of time has elapsed.

20. The apparatus of claim 1, wherein the read control signal causes the data retrieving unit to generate a read address for retrieving the recorded data from the DPRAM at a different time the write address is generated by the data recording unit.

21. The apparatus of claim 20, wherein the read address is generated a delay time after generation of the write address, the delay time based on said prescribed period of time.

22. The apparatus of claim 21, wherein the delay time is at least substantially equal to said prescribed period of time.

23. The apparatus of claim 1, wherein the first and second system clocks have different phases.

24. The apparatus of claim 1, wherein the clock monitoring unit, delay unit, and comparing unit are included in the data recording unit.

25. The apparatus of claim 4, wherein the delay unit generates the delay value based on the clock comparison performed by the clock monitoring unit and a delay enable signal received from the write counter.

26. The apparatus of claim 25, wherein the delay enable signal is based on a specific value of the write address output from the write counter.

27. The apparatus of claim 3, wherein the clock monitoring unit determines the monitored state of the second system based on a division of the second system clock by the first system clock.

28. The method of claim 14, wherein the state of the second system is monitored by comparing the first system clock to the second system clock.

29. The method of claim 28, wherein the first system clock is compared to the second system clock by dividing the second system clock by the first system clock.

30. The method of claim 18, wherein the delay value is computed based on the monitored state of the first transmission system, determined by comparing the clock of the first system to a clock of the second system.

31. The method of claim 30, wherein the monitored state of the first transmission system is determined by dividing the first system clock by the second system clock.

* * * * *